United States Patent [19]

Deitz

[11] Patent Number: 5,162,274
[45] Date of Patent: Nov. 10, 1992

[54] REGENERATION OF WHETLERITE FOR ADSORBING TOXIC POLLUTANTS FROM AIR

[75] Inventor: Victor R. Deitz, Chevy Chase, Md.

[73] Assignee: The United States of America as represented by the Secretary of the Navy, Washington, D.C.

[21] Appl. No.: 627,163

[22] Filed: Dec. 13, 1990

[51] Int. Cl.$^5$ .................... B01J 20/34; B01J 38/16; B01J 38/14; C07C 3/00

[52] U.S. Cl. ........................ 502/51; 55/71; 55/74; 423/236; 502/52; 502/401

[58] Field of Search ............ 502/51, 38, 34, 515, 502/52; 423/236, 240-245

[56] References Cited

U.S. PATENT DOCUMENTS

| | | | |
|---|---|---|---|
| 2,920,050 | 1/1960 | Blacet et al. | 502/417 |
| 2,920,051 | 1/1960 | Wiig et al. | 502/417 |
| 4,094,815 | 6/1978 | Cedro, III et al. | 502/34 |
| 4,531,953 | 7/1985 | Groose et al. | 502/401 |
| 4,656,148 | 4/1987 | Buhler et al. | 502/34 |
| 4,664,683 | 5/1987 | Degen et al. | 55/387 |
| 4,801,311 | 1/1989 | Tolles | 423/236 |
| 4,802,898 | 2/1989 | Tolles | 423/240 S |

OTHER PUBLICATIONS

Dietz et al. "Temperature-Reversible Oxidation of Carbon Monoxide by New and Weathered Whetlerite" *Carbon*, vol. 24, 463-468 (1986).

Quarterly Report of Jan.-Mar. 1987, Chemistry and Physics of Surfaces-Collection and Individual Protection; Chemical Reaction of Carbon Monoxide with Degraded Whetlerites.

*Primary Examiner*—Paul E. Konopka
*Attorney, Agent, or Firm*—Thomas E. McDonnell; Barry A. Edelberg

[57] ABSTRACT

Whetlerite degraded by exposure to atmospheric contaminants is treated to restore its ability to adsorb toxic air pollutants by passing through it a flow of an oxygen-containing gas further containing from 500 to 2000 ppm of carbon monoxide and water vapor corresponding to 60 to 90 percent relative humidity at 60 to 80 degrees C.

6 Claims, No Drawings

REGENERATION OF WHETLERITE FOR ADSORBING TOXIC POLLUTANTS FROM AIR

BACKGROUND OF THE INVENTION

1. Field of the Invention

This invention relates to a method of regenerating adsorbents for removing toxic pollutants from air. More specifically, it relates to a method of restoring the ability of metal oxide-impregnated activated carbon referred to as whetlerite to remove cyanogen chloride from air.

2. Description of the Prior Art

Whetlerites are activated carbon-based composites impregnated with ammoniacal solutions of divalent copper and monovalent silver, with or without hexavalent chromium, in various concentrations. Optionally, triethylenediamine (TEDA) is added to prolong the service life of the adsorbent and resist the adverse effects of humid environments. Whetlerites adsorb a wide variety of toxic air pollutants, in particular cyanogen chloride, cyanogen, and hydrogen cyanide. They have been used as charcoal filters for gas masks for personnel protection in military combat and in polluted atmospheres, as well as for air intake filters for building air conditioning systems.

It has been found convenient to express the ability of whetlerite and other adsorbents to adsorb toxic air pollutants, in terms of its ability to remove cyanogen chloride, ClCN, from air under standardized conditions. These are as follows:

TABLE 1

| Standard Test Conditions for Evaluating Carbon Adsorbents | |
|---|---|
| Inlet cyanogen chloride concentration | 4 mg/L = 1560 ppmv |
| End point breakthrough ppmv | 0.008 mg/L = 3.2 |
| Continuous air flow | 1630 ml/min |
| Sample bed depth | 30 mm |
| Contact time | 0.31–0.35 second |
| Moisture in air humidity | 80% relative |
| Prehumidification | 16 hours |

The ability to adsorb cyanogen chloride is expressed in terms of the time to the breakthrough of cyanogen chloride in the effluent of the adsorbent bed.

In the course of time, whetlerite degrades as it adsorbs impurities form the atmosphere, and this degradation is reflected in a decreased ability to adsorb toxic pollutants. This degradation is attributed to the transformation of the copper in the whetlerite, originally in the form of bicarbonate, into the oxide, and the reduction of chromate, originally present as ammonium chromate, into a chromous compound (Cr III).

Several methods of restoring adsorptive capacity to whetlerite and other adsorbents are known. U.S. Pat. No. 4,094,815 relates to the regeneration of activated carbon by passing a mixture of gases and/or vapors capable of reacting exothermically through the bed of activated carbon. The exothermic heat liberated heats the carbon and strips the adsorbed material. The gaseous mixture may be chlorine plus either carbon monoxide or hydrogen. U.S. Pat. No. 4,656,148 relates to a process for the reactivation of a catalyst containing iron oxides for the removal of NOx, oxides of nitrogen, from stack gases by passing carbon monoxide at elevated temperature through the catalyst bed. Two catalyst beds are used. They alternate between NOx removal and regeneration. U.S. Pat. No. 4,801,311 relates to a chromium-free activated carbon of the whetlerite type for removing toxic gases such as hydrogen cyanide, cyanogen, and cyanogen chloride. This chromium-free whetlerite, which contains 1–7.5% of triethylenediamine, is as active as chromium- containing whetlerite.

None of the methods in the prior art restore degraded whetlerites for adsorbing toxic air contaminants such as cyanogen chloride. Therefore, there is a need for such a method, and more particularly an economical method for regenerating whetlerites in situ.

SUMMARY OF THE INVENTION

It is an object of the present invention to restore to a degraded whetlerite the ability to adsorb toxic air pollutants.

It is another object of the present invention to enable in situ restoration of the ability of a degraded whetlerite to adsorb toxic air pollutants.

It is a further object of the present invention to restore to a degraded whetlerite the ability to adsorb cyanogen chloride.

In accordance with the invention, it has now been determined that the treatment of degraded whetlerite with a mixture of air, carbon monoxide, and water vapor is especially effective in restoring the ability of whetlerite to adsorb toxic pollutants. The whetlerite may be regenerated in situ in its filter housing or cartridge without having to be removed therefrom.

The process for regenerating degraded whetlerites comprises passing a stream of air containing 500–2000 ppm, preferably 900–1000 ppm by volume of carbon monoxide at a temperature of 50–100 degrees C., preferably 60–80 degrees C., and 60–90%, preferably about 80% relative humidity for 30 minutes to 4 hours, preferably 1–2 hours. Carbon monoxide is believed to react with an oxygen complex with the metal supported on the carbon of the adsorbent, forming carbon dioxide and carbon. The copper on the carbon is restored to its original bicarbonate form, and chromium is reoxidized from its trivalent to its hexavalent state.

Air serves as a carrier for the carbon monoxide and water vapor as well as for the impurities being removed from the adsorbent. Instead of air, any oxygen-containing gas/water vapor mixture having a partial pressure of oxygen between about 60 and about 160 mm Hg may be used.

DETAILED DESCRIPTION OF THE PREFERRED EMBODIMENTS

Methods for preparing a variety of whetlerites for the removal of cyanogen chloride and other toxic air contaminants are known. Details of the preparation in U.S. Pat. Nos. 4,801,311, 2,920,050 and 2,920,051 are incorporated herein by reference. Degraded whetlerite in its filter housing or cartridge is exposed to a flow of moist air and carbon monoxide. The carbon monoxide content of the air ranges from 500 to 2000 ppm by volume, preferably 950 to 1000 ppm by volume on a dry basis. The air is humidified to 60 to 90 percent relative humidity, preferably about 80 percent relative humidity, between 50 and 100 degrees C., preferably 60 to 80 degrees C. This gas mixture is passed through the whetlerite for 30 minutes to 4 hours, preferably 1–2 hours. The regeneration of the whetlerite is evidenced in Table 2 as follows:

TABLE 2

Regeneration of Degraded Whetlerite with CO, Water Vapor and Air

| Sample Description Time | Relative Humidity | CO Treatment | Breakthrough for Cyanogen Chloride, Min. |
|---|---|---|---|
| Degraded whetlerite No TEDA | 0 | None | 0 |
| Regenerated whetlerite No TEDA | 0 | 60 deg C. | 40 |
| TEDA ASC Whetlerite No exposure | 80 | None | 73 |
| TEDA ASC Whetlerite No exposure | 80 | Yes | 104 |
| TEDA ASC Whetlerite 78 days of exposure | 80 | None | 58 |
| TEDA ASC Whetlerite 78 days of exposure | 80 | Yes | 78 |
| TEDA ASC Whetlerite 158 days of exposure | 80 | None | 45 |
| TEDA ASC Whetlerite 158 days of exposure | 80 | Yes | 62 |
| TEDA ASC Whetlerite 329 days of exposure | 80 | None | 20 |
| TEDA ASC Whetlerite 329 days of exposure | 80 | Yes | 73 |

In degraded whetlerites not containing TEDA, prehumidification can destroy any gain in adsorbence imparted by the CO interaction. TEDA-containing degraded whetlerites, however, have a significantly enhanced resistance to humidity. In CO whetlerites containing sufficient TEDA to prolong the serviceable life and the moisture resistance of the whetlerites (typically about 1-7.5 weight percent triethylenediamine, as stated in the above-mentioned U.S. Pat. No. 4,801,311), the combination of prehumidification and CO treatment enhances restoration more than either treatment alone.

While there have been described what are at present considered to be the preferred embodiments of the invention, it will be obvious to those skilled in the art that various changes and modifications may be made therein without departing from the invention and it is therefore intended to cover all such modifications and changes as fall within the spirit and scope of the invention.

What is claimed is:

1. A method of regenerating a degraded whetlerite filter having triethylenediamine in an mount sufficient to significantly prolong the serviceable life and moisture resistance of said whetlerite filter, comprising the step of subjecting whetlerite to flow of a gas having a partial pressure of oxygen from about 60 to about 160 mmHg and a relative humidity of 60 to 90% and including about 500 to about 2000 ppm by volume carbon monoxide on a dry basis, at a temperature between about 50 and about 90 degrees C.

2. The method of claim 1 in which the temperature is between 60 and 80 degrees C.

3. The method of claim 1 in which the relative humidity of said gas is about 60 to about 80 percent.

4. The method of claim 1 in which the carbon monoxide content of the gas, on a dry basis, is from about 900 to about 1000 parts per million by volume.

5. The method of claim 1, wherein said whetlerite includes about 1-7.5 weight percent triethylenediamine.

6. The method of claim 1, wherein said step of subjecting said whetlerite to said gas restores the ability of said whetlerite to remove cyanogen chloride from air.

* * * * *